INVENTOR
JAMES C. STARKEY

June 2, 1970
J. C. STARKEY
3,515,660
ELECTRODE STEM CONNECTOR, ELECTRODE ASSEMBLY AND
ELECTROLYTIC CELL INCLUDING THE SAME
Filed Nov. 13, 1967
2 Sheets-Sheet 2
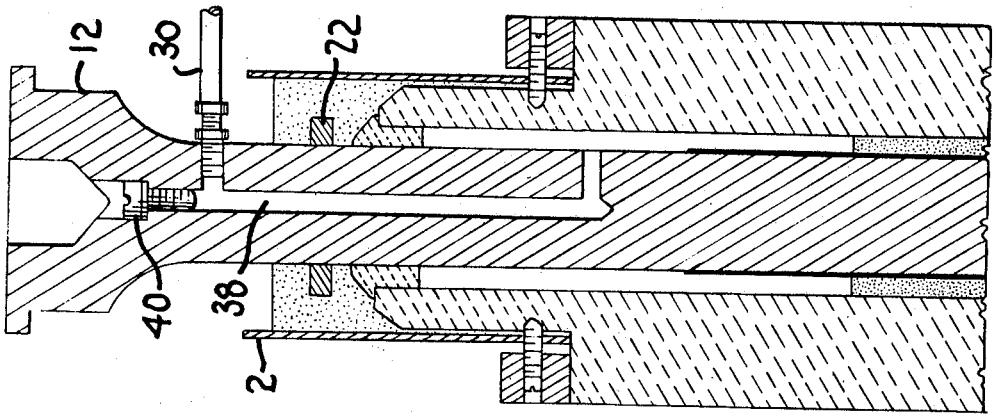
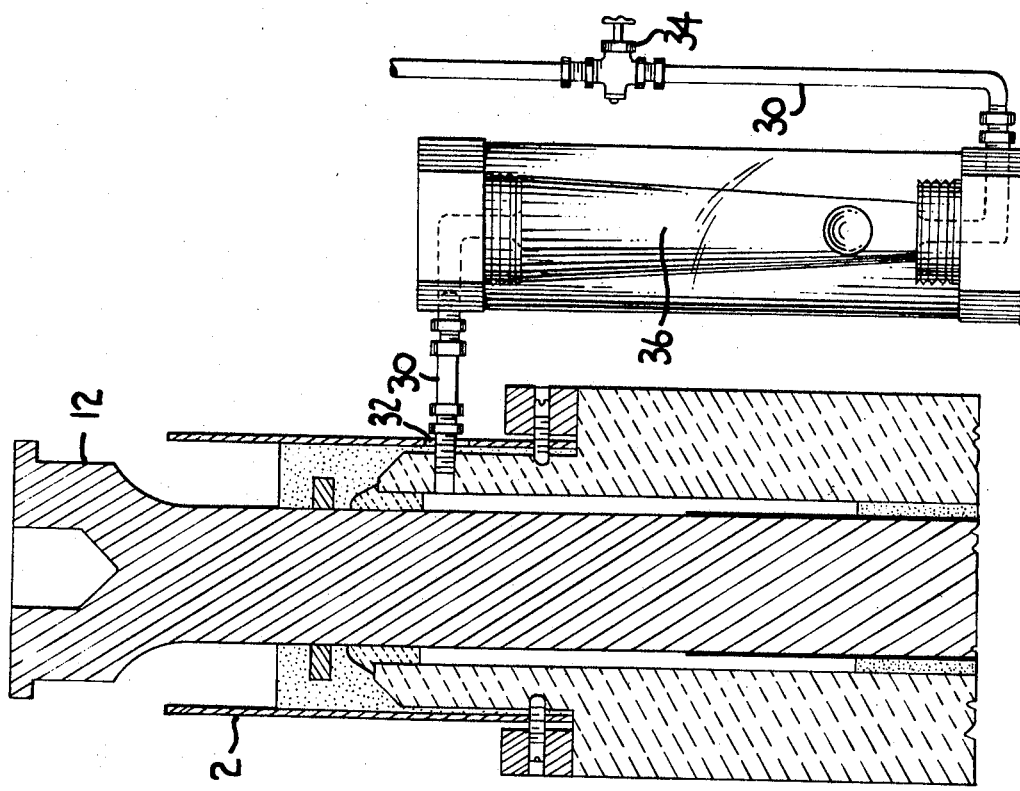
INVENTOR
JAMES C. STARKEY
BY
ATTORNEYS United States Patent Office 3,515,660
Patented June 2, 1970

3,515,660
ELECTRODE STEM CONNECTOR, ELECTRODE ASSEMBLY AND ELECTROLYTIC CELL INCLUDING THE SAME
James C. Starkey, New Martinsville, W. Va., assignor to PPG Industries, Inc., Pittsburgh, Pa., a corporation of Pennsylvania
Filed Nov. 13, 1967, Ser. No. 682,378
Int. Cl. C22d 1/04
U.S. Cl. 204—250        22 Claims

ABSTRACT OF THE DISCLOSURE

An electrode stem connector and an electrode are described. The structure common to both includes a metal rod entering a recess in a current conducting member. The smaller dimensions of the rod result in a space between the rod and the member which is filled with a liquid metal and a gas and then sealed. Mercury is disclosed to be the preferred liquid metal and air the preferred gas. The liquid metal serves to relieve thermal and mechanical strains and the gas maintains a positive pressure on the interior of the assembly to retard corrosion of the interior parts by electrolyte or fluid products. The gas-liquid metal combination also aids in the detection of cracked assemblies. Particular applicability of the electrode stem connector and electrode to chlor-alkali mercury cathode cells is taught.

---

Figure 1:
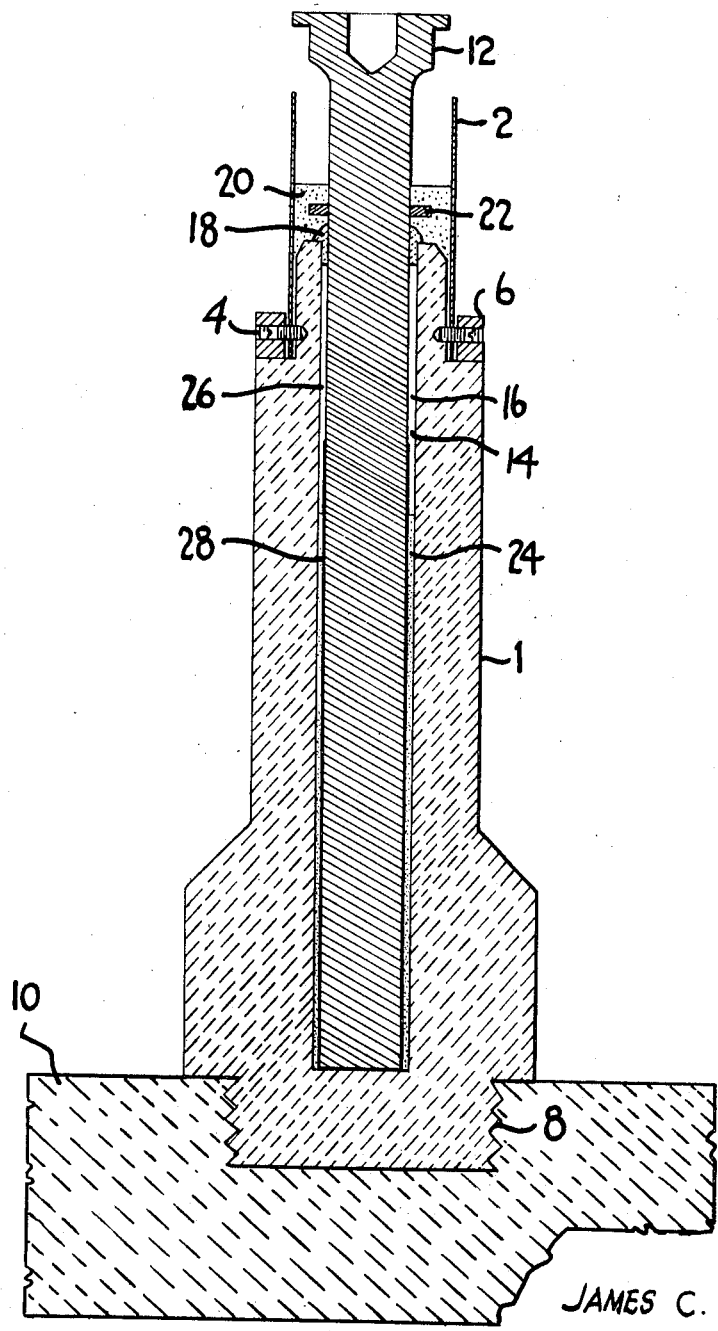

This invention relates to an electrode stem connector, an electrode and to electrolytic cells employing such an electrode stem connector or electrode.

Electrode stem connectors of frangible materials such as graphite have found many applications in the field of electrochemistry, particularly in conjunction with electrodes of the same or different frangible material. In such applications, it is desirable to transfer electrical energy from a source through metallic power supply lines to the electrode of the electrolytic cell, thereby necessitating a junction of metal and frangible material for the passage of current. Such junctions, however, have not been entirely satisfactory because a low resistance junction requires close contacting of the parts and because such close contact of materials, which usually have different coefficients of expansion, ofttimes causes cracks in the frangible material when a temperature variation occurs. Various solders and electrical conducting adherents have been used in the past to bond the metal to the frangible material, but these suffer from the same deficiency of being solids which are not yieldable enough to relieve thermally induced strains which cause cracks.

Another disadvantage of the prior art with respect to such composite electrode stem connectors is that once a passageway is formed in the frangible material, whether the result of thermal cracks, imperfections in manufacture or other means, the electrolyte or fluid products which are within the cell and which are generally corrosive in nature, penetrate and corrode the metal conductor, solder and even interior portions of the frangible material itself. The result is an increase in the electrical resistance of the assembly, a breakdown of the physical support for the parts, the introduction of more cracks and pores, contamination of the electrolyte or the products and the ultimate functional failure of the entire unit.

This invention contemplates an electrode stem connector having a reduced tendency to crack or corrode while maintaining a low resistance to the passage of electrical current.

For a better understanding of the invention, reference may be made to the drawings wherein like numerals refer to like parts and in which:

FIG. 1 illustrates an appropriate embodiment of the invention, and
FIG. 2 illustrates a further embodiment of the invention which is a modification of FIG. 1.
FIG. 3 illustrates a further embodiment of the invention which is an alternative to that of FIG. 2.

Referring now to FIG. 1, an electrode stem connector suitable for use in the practice of the invention includes a current conducting member 1 which may advantageously be carbonaceous in nature, as for example, graphite, carbon, or the like either alone or with suitable fillers, binders or sealants, all of which materials are well known to the art. Affixed to one end of the member 1 are means for fastening the electrode stem connector to the electrode supporting structure of an electrolytic cell. Inasmuch as the electrodes are often slowly consumed during operatiton of the cell, these means advantageously provide for adjustable movement of the electrode assembly in order that the optimum gap between anode and cathode may be maintained over long periods of time. The fastening means shown in the drawing comprise an adjusting sleeve may be affixed to the electrode supporting structure in threaded engagement with suitably tapped holes in collar 6 and which pass through apertures in the adjusting sleeve 2 and engage the member 1. The adjusting sleeve may be affixed to the electrode supporting structure, not shown, by friction, set screws, threads, brazing, soldering or any other means conventional in the art. Adjustment may be effected by movement between the adjusting sleeve and its mating element of the electrode supporting structure or the electrode stem connector may be rigidly attached to parts of the supporting structure which provide for movement between these parts and other parts of the supporting structure.

The other end of the member 1 terminates preferably with a threaded stud portion 8 which mechanically engages the actual electrode 10. This threaded portion of the member 1 provides for ready removal and replacement of the electrode 10, allows the composition of the material 1 and the electrode 10 to be the same or different and permits any desired variations in the combinations of materials to be easily expedited. In the case where the materials are the same, the member and electrode may be formed integrally with the elimination of the threaded stud, in which case the member becomes a portion of the electrode itself. While a threaded connection has been shown, other means may be used, as for example, frictionally engaged surfaces, pins, keys and the like.

A current conducting rod 12, usually of metal which ordinarily is copper, silver, aluminum, iron, titanium, zirconium, hafnium or alloys containing one or more of these metals; brass, bronze and steel being representative examples, is positioned within a recess 14 in member 1. The cross-sectional dimensions of the rod 12 are less than those of the recess 14, resulting in a space 16 between the rod 12 and the member 1. Packing 18, which may be asbestos rope, plastic, rubber gasket or other corrosion resistant material, wrapped about the rod 12 and stuffed into a portion of the space 16 acts in conjunction with inert sealant 20 which may be wax, resin, cement or the like to provide a fluid tight seal remotely located from the bottom of the recess 14. Radial pins 22 welded, soldered, brazed, screwed or otherwise affixed to the rod 12 aid in preventing movement of the rod within the sealant 20 and any leaks resulting therefrom when the entire electrode stem connector is adjusted, using the sleeve member, in a direction parallel to the axis of the connector. With the fluid tight seal in place, that portion of the space 16 from the bottom of the recess 14 to the seal is a chamber.

Within the chamber is position a liquid metal 24 and a gas 26. The liquid metal may advantageously be mercury, an alkali metal, lead, tin, calcium, gallium, low melting alloys such as Wood's metal, Lipowitz alloy, alloys of these metals, as for example, NaK or amalgams, or any metal or metal alloy which remains liquid at the operating temperature of the electrode stem connector. The choice of the particular metal will depend upon the operating temperature of the cell involved and upon the environment surrounding the electrode stem connector. Mercury is the preferred liquid metal for use in a connector for the anode of a chlor-alkali cell having a mercury cathode.

The gas 26 may be any suitable gas which is generally inert with respect to the various parts of the electrode stem connector and to the electrolyte and products of the cell. The gas may be the same as any gaseous product produced by the cell if it is not corrosive to the parts of the connector or it may be different. Illustrative examples include air, nitrogen, oxygen, helium, neon, argon, krypton, xenon and suitable mixtures thereof.

Where it is desired to use a metal for the rod 12 which is attacked by the liquid metal 24, the rod may include a protective film 28 of another electric current conducting material which is less susceptible to attack. Prior to assembly of the connector, the protective film may be tinned, coated, plated or deposited on that portion of the metal of rod 12 which would otherwise come in contact with liquid metal upon assembly. Materials useful as a protective film include tin, copper, gold, silver, platinum and similar metals and their alloys. When, for example, the rod is formed of copper and the liquid metal is mercury, a protective film of tin effectively reduces amalgamation of the copper.

In operation, the presence of the liquid metal between the member and rod provides for continuing electrical contact between these parts while permitting the effects of thermal and other mechanical stresses to be dissipated as relative movement rather than as strains in the materials themselves.

In heating up the electrode stem connector from ambient temperature to the elevated temperature encountered in the operation of the cell, typically 140 to 200° F. in the case of a chlor-alkali mercury cathode cell, the pressure of the gas rises due to the increase in temperature. This compression is usually enhanced by thermal expansion of the liquid metal also within the chamber. Should any pinhole leaks occur in the member, a positive pressure from within the electrode stem connector will oppose migration of the electrolyte and/or fluid products of the cell into the interior of the connector, thereby reducing corrosion of the internal parts.

In the event that a crack should occur below the level of the liquid metal, the liquid metal is discharged therethrough and an increase in resistance causes a significant increase in voltage between the rod and the member. Routine amperage and/or voltage checks are adequate to detect a faulty connector and permit early replacement before significant corrosion occurs in the rod or liquid metal and before the corrosion poducts contaminate the electrolyte, products and cell parts. In the case of a chlor-alkali cell having a mercury cathode and carbonaceous anode supported by a connector whose liquid metal is substantially the same as that of the cathode, the mercury escaping from the connector will fall into and become a part of the mercury cathode.

Aside from its function as a container for the liquid metal and compressed gas, the chamber confines any metal vapors which may evolve from the liquid metal to the interior of the connector and retards any further evaporation of metal from taking place due to the increased vapor pressure therein.

An additional aspect of the invention provides for an electrode stem connector containing a metal which is liquid at the operating temperature of the cell but which is solid at ambient temperatures. By using a metal or metal alloy which has a melting point just above normal ambient temperatures, as for example, a melting point within the range of 50 to 150° F., the rod and member will be firmly attached for shipment, installation and removal, and will preclude the placing of undue strain upon the seal while the strain relieving movement of the member and rod will be permitted above the melting point of the metal. By making the difference between the ambient temperature and melting point small, the expansion strains will be small at temperatures below the melting point and well within tolerable limits. Since the temperatures encountered in the operation of an electrolytic cell are often substantially above normal ambient conditions, this particular embodiment of the invention still permits dissipation of the destructive strains which would build up over the broad change in temperature.

Another embodiment of the invention is depicted in FIG. 2. Here, in addition to the structure heretofore described, is shown a tube 30 communicating with the chamber and a supply, not shown, of gas 26. The tube 30 passes through a hole 32 in adjusting sleeve 2 and is securely affixed at one end to member 1 by any suitable means known to the art such as threads or adhesive. The other end of the tube 30 is connected to the gas supply directly or through a header. The gas supply may take the form of a storage vessel, reservoir, expansion bag, gas generator, or the like. An optional, but desirable, valve 34 may be functionally attached to the tubing between the chamber and the gas supply. Similarly optional is a flow indicator 36 which may assume any form known to the art such as an orifice and manometer, venturi and manometer, twirling vane, propeller, impinged flapper, bubbler or, as shown, a rotameter, and which is also functionally attached to the tube between the chamber and the gas supply.

In operation, the tube serves to supply the chamber with a continuous supply of gas under positive pressure. Should any pinhole leaks or small cracks occur above the level of the liquid metal within the chamber, the gas supply replenishes the small amount of gas lost, thereby maintaining the gas pressure and extending the useful life of the electrode stem connector.

If a crack occurs below the level of the liquid metal, the gas will force the liquid metal through the crack with little pressure decrease within the chamber. Detection of cracked connectors by routine electrical checks is thus facilitated.

The valve advantageously permits the gas from the supply to be either throttled or cut off entirely if a major crack occurs. This prevents the loss of excessive amounts of gas and the accompanying decrease in pressure from the supply and any interconnected electrode stem connectors.

The flow indicator aids in the detection of faulty connectors by showing the presence of any major gas flows through the tube. The advantage of its use is the rapidity with which grossly defective connectors may be discerned from those which are satisfactory.

FIG. 3 depicts an electrode stem connector having a modified rod. In this embodiment the tube 30 communicates with the chamber through passageway 38 within the rod itself. The other end of the tube is connected to a gas supply as heretofore described. Screw 40 prevents the escape of gas from ths access portion of the passageway. Advantages of this embodiment include the elimination of a separate seal for tube 30 in the lid of an electrolytic cell producing gaseous products, as for example, a chlor-alkali cell, and the elimination of the direct connection of tube 30 and member 1 together with the attendant sealing problems.

The electrode stem connector of the present invention has particular utility in chlor-alkali cells having a mercury cathode. In addition to the mercury cathode, these cells have a brine electrolyte, a container for the electrolyte, and a carbonaceous anode connected to a power source by at least one electrode stem connector heretofore described.

The following example illustrates in detail application of the invention. The example is not intended to limit the invention for there are, of course, numerous possible variations and modifications.

EXAMPLE

A solid copper rod having a diameter of 1 3/16 inches was inserted into a recess having a diameter of 1 1/4 inches and a depth of 10 7/8 inches in a conventional hollow graphite member provided with an adjusting sleeve. Approximately 205 grams of mercury were placed in the annular space between the rod and the member. Air was allowed to remain in the remaining portion of the space. The mouth of the annular space was packed with asbestos rope and wax (100 milliliters) was poured into the space above the member between the copper rod and the adjusting sleeve to a depth of about 2 inches. The over-all voltage drop across each of six connectors assembled in this manner was found to be 0.5 millivolt at 25 amperes.

Connectors similar to the above were made except that a solid solder (61.9 percent tin, 38.1 percent lead) was substituted for the mercury. The over-all voltage drops measured across these connectors fell within the range of 1.5 to 4.0 millivolts at 25 amperes.

The electrode stem connector and electrode assembly of the present invention also find utility in electrolytic cells operating at substantially higher temperatures than chloralkali cells, as for example, cells containing a fused salt electrolyte.

While the foregoing description has particular reference to electrolytic cells dependent upon an external source of electrical power for their operation, the electrode and electrode stem connector of the present invention have general utility and may be used as an electrode in an electrochemical cell designed for supplying electrical energy, as for example, a battery.

It is apparent that many widely different embodiments of this invention can be made without departing from the spirit and scope thereof; and, therefore, it is not intended that the invention be limited except as indicated in the appended claims.

I claim:
1. An electrode stem connector comprising
 (a) a current conducting member having a recess therein,
 (b) a current conducting rod of lesser cross-sectional dimensions than and positioned within said recess defining a space between the member and the rod,
 (c) a fluid tight seal between the member and the rod remotely located from the bottom of the recess which seal attaches the rod to the member,
 (d) said space from the bottom of the recess to the seal defining a chamber,
 (e) said chamber containing
  (1) a liquid metal in electrical contact with the member and the rod, and
  (2) a gas above said liquid metal, and
 (f) means for attaching an electrode to the member.
2. An electrolytic cell comprising a container for electrolyte and electrodes including an anode and a cathode, at least one of said electrodes being attached to the electrode stem connector of claim 1.
3. An electrolyte cell as defined in claim 2 wherein an electrode attached to said electrode stem connector is the anode.
4. An electrolytic cell as defined in claim 3 wherein the member is a carbonaceous material, the liquid metal comprises mercury, the gas comprises air, and the cathode comprises mercury.
5. An electrolytic cell as defined in claim 2 wherein the gas within the chamber is $Cl_2$.
6. An electrolytic cell as defined in claim 2 wherein the gas within the chamber is selected from the group consisting of nitrogen, oxygen, helium, neon, argon, krypton, xenon, and mixtures thereof.
7. An electrolytic cell as defined in claim 2 wherein another electrode is a liquid metal which is substantially the same as the liquid metal within the electrode stem connector attached to the first electrode.
8. An electrode stem connector as defined in claim 1 including a tube communicating with the chamber and with a supply of the gas.
9. An electrode stem connector as defined in claim 8 including a valve functionally attached to the tubing between the chamber and the supply of gas.
10. An electrode stem connector as defined in claim 8 including a flow indicator functionally attached to the tubing between the chamber and the supply of gas.
11. An electrode stem connector as defined in claim 1 wherein that portion of the rod in contact with the liquid metal is a protective film of electric current conducting material.
12. An electrode stem connector as defined in claim 11 wherein the liquid metal comprises mercury and the protective film comprises tin.
13. An electrode stem connector as defined in claim 1 wherein the member comprises a carbonaceous material.
14. An electrode stem connector as defined in claim 13 wherein the member is impregnated with a sealant.
15. An electrode stem connector as defined in claim 1 wherein the liquid metal comprises mercury.
16. An electrode stem connector as defined in claim 1 wherein the member and the electrode comprises carbonaceous materials.
17. An electrode stem connector as defined in claim 1 including means for mounting the connector in an electrolytic cell.
18. A electrode stem connector as defined in claim 1 wherein the gas is air.
19. An electrode stem connector comprising
 (a) a current conducting member having a recess therein,
 (b) a current conducting rod of lesser cross-sectional dimensions than and positioned within said recess defining a space between the member and the rod,
 (c) a fluid tight seal between the member and the rod remotely located from the bottom of the recess which seal attaches the rod to the member,
 (d) said space from the bottom of the recess to the seal defining a chamber,
 (e) said chamber containing
  (1) a metal which is a liquid below about 200° F. in electrical contact with the member and the rod but which is a solid at ambient temperatures, and
  (2) a gas, and
 (f) means for attaching an electrode to the member.
20. An electrolytic cell comprising
 (a) a container for the electrolyte, and
 (b) electrodes including an anode and a cathode,
  (1) at least one of said electrodes being a liquid metal,
  (2) another of said electrodes being attached to an electrode stem connector comprising
   (a) a current producing member having a recess therein,
   (b) a current conducting rod of lesser cross-sectional dimensions than and positioned within said recess defining a space between the member and the rod,
   (c) at least a portion of said space containing a liquid metal which is substantially the same as the liquid metal of the first electrode, and
   (d) means for attaching an electrode to the member.

21. An electrolytic cell comprising
(a) a container for electrolyte, and
(b) electrodes including an anode and a cathode,
(1) at least one of said electrodes being a liquid metal,
(2) another of said electrodes being an electrode assembly comprising
(a) a current conducting member having a recess therein,
(b) a current conducting rod of lesser cross-sectional dimensions than and positioned within said recess defining a space between the current conducting member and the rod,
(c) at least a portion of said space containing a liquid metal which is substantially the same as the liquid metal of the first electrode.

22. An electrode assembly comprising
(a) a current conducting member having a recess therein,
(b) a current conducting rod of lesser cross-sectional dimensions than and positioned within said recess defining a space between the current conducting member and the rod,
(c) a fluid tight seal between the current conducting member and the rod remotely located from the bottom of the recess which seal attaches the rod to the current conducting member,
(d) said space from the bottom of the recess to the seal defining a chamber,
(e) said chamber containing
(1) a liquid metal in electrical contact with the current conducting member and the rod, and
(2) a gas above said liquid metal.

References Cited
UNITED STATES PATENTS

| | | | |
|---|---|---|---|
| 3,260,662 | 7/1966 | Henegar | 204—279 |
| 3,023,393 | 2/1962 | Oliver | 204—279 |

JOHN H. MACK, Primary Examiner

S. S. KANTER, Assistant Examiner